A. WINTON.
LUBRICATING MECHANISM FOR PINS.
APPLICATION FILED DEC. 23, 1916.

1,280,117.  Patented Sept. 24, 1918.

Witness
S. W. Brainard

Inventor
Alexander Winton
By Brockett and Hyde
Attorneys

UNITED STATES PATENT OFFICE.

ALEXANDER WINTON, OF LAKEWOOD, OHIO.

LUBRICATING MECHANISM FOR PINS.

1,280,117.  Specification of Letters Patent.  Patented Sept. 24, 1918.

Application filed December 23, 1916. Serial No. 138,656.

*To all whom it may concern:*

Be it known that I, ALEXANDER WINTON, citizen of the United States, residing at Lakewood, in the county of Cuyahoga and State of Ohio, have invented certain new and useful Improvements in Lubricating Mechanism for Pins, of which the following is a specification.

This invention relates to lubricating structures for pins and particularly to such structures for use on or with wrist pins of motors.

Heretofore pins and particularly wrist pins have been made hollow and oil is supplied to or allowed to accumulate in the opening in the pin and then be fed to some of the bearings of the pin through oil openings in the pin, but in the use of pins of this type time is required to fill the opening and damage may result before the opening in the pin is filled to the point of lubricating the bearings.

This difficulty has led to the present invention wherein the pin is supplied with an internal sleeve of less outside diameter than the bore of the pin throughout most of its length but enlarged at the ends to fit the bore and thereby providing an annular oil space of small capacity and inclosed so that it fills readily and conveys the lubricant to the pin bearings through openings provided therein.

The invention may be further briefly summarized as consisting in the construction and combination of parts hereinafter described in the following description, drawings and claims.

Figure 1:
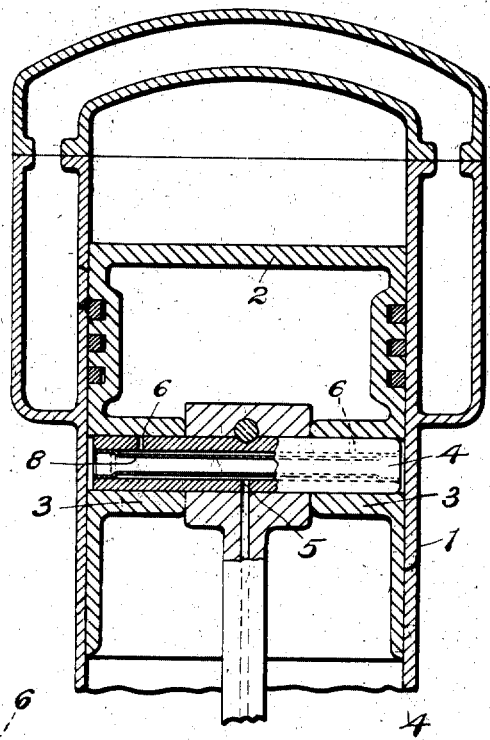
Figure 2:
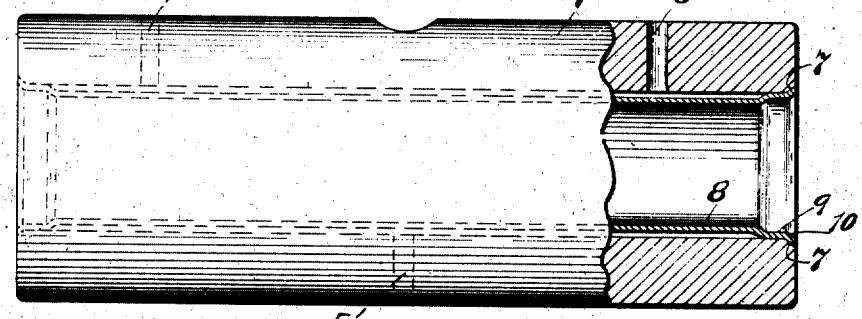
Figure 3:
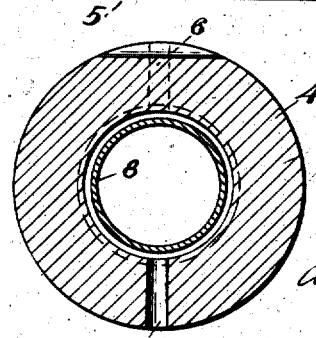

Referring to the drawings Figure 1 is a sectional view of a portion of a cylinder and piston with a part of the connecting rod and provided with my pin lubricating structure; Fig. 2 is a view partly in elevation and partly in section showing the pin alone; and Fig. 3 is a sectional view of the pin.

In the arrangement shown 1 represents the cylinder which is provided with the usual trunk or other piston 2. This piston is provided with the customary wrist pin bearings 3 bored to receive the wrist pin 4 which is preferably hollow, open ended and provided with a central oil opening 5 at the bottom and two oil ports or openings 6 at the top and within the bearing area of the bearings 3. So far the description has been confined to one type of pin to which my invention is applicable and all of which is old in the art and my description from now on will be confined to the improvement which constitutes my invention.

The inner edges of the wall of the pin at the opening and at the ends is beveled or rounded at 7 for a purpose which will appear. Within the opening of the pin and spaced from the inner wall thereof is a sleeve 8 having enlarged end portions 9 fitting the bore of the pin and end flanges 10 formed or otherwise made to conform to the beveled or rounded edges 7. It is obvious that the enlargements 9 serve to hold the sleeve in proper relation to the pin and that the flanges hold the sleeve in place in the opening of the pin.

In operation the oil is forced into one of the openings, as 5 for instance, until the annular chamber around the sleeve is filled when the oil will pass out the other openings, as 6 for instance, to the bearings.

Having described my invention, I claim:—

1. A lubricating structure for hollow pins having lateral oil supply and discharge openings, comprising means providing an annular reservoir within the inner wall of said pin and communicating with the supply and discharge openings in the pin.

2. A lubricating structure for hollow pins having lateral oil supply and discharge openings, comprising a sleeve within the opening in the pin and forming an annular oil chamber within the pin, said pin and sleeve being provided with means for holding the sleeve within the pin.

3. A lubricating structure for hollow pins having lateral oil supply and discharge openings, comprising a sleeve of less diameter than the bore of the pin thereby forming an annular oil chamber with the pin and having enlarged end portions engaging the inner wall of the pin.

4. A lubricating structure for hollow pins having lateral oil supply and discharge openings, a sleeve of less diameter than the bore of the pin thereby forming an annular oil chamber with the pin and having enlarged end portions engaging the inner wall of the pin, and flanges at the ends of the sleeve and engaging the ends of the pin for holding the parts in their proper relation.

In testimony whereof I affix my signature.

ALEXANDER WINTON.